Figure 1:
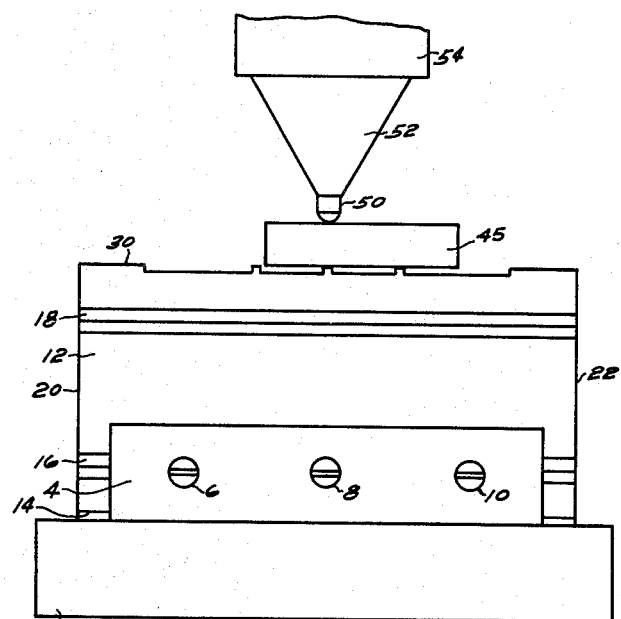

June 1, 1965 W. L. HAYES ETAL 3,186,094
NON-WRINGING ANVIL
Filed Jan. 28, 1960

WOODROW L. HAYES
MARTIN DOTSKO
INVENTOR

BY *Delbert B. Warner*

ATTORNEY

United States Patent Office 3,186,094
Patented June 1, 1965

3,186,094
NON-WRINGING ANVIL
Woodrow L. Hayes and Martin Deisko, Binghamton, N.Y., assignors to General Precision, Inc., a corporation of Delaware
Filed Jan. 28, 1960, Ser. No. 5,192
3 Claims. (Cl. 33—174)

This invention relates to equipment for accurately determining the dimensions of gage blocks or other objects by direct measurement with an optical interferometer, by direct measurement with a mechanical measuring device, or by use of a comparator for comparing the dimensions of a known standard gage block with those of an unknown object and in particular it relates to an improved anvil for use with such measuring devices.

In order to secure accurate measurements of a gage block with an interferometer, a comparator, or a mechanical measuring machine, it is necessary that a reference plane be chosen such that the distance from that plane to a measuring head can be accurately determined. In the prior art devices such a plane has been located in the face of an optically flat anvil, or in the highest points on a serrated surface of such an anvil.

Prior art anvils, constructed as indicated above, have been successfully used in making highly accurate measurements. There are disadvantages to their use, however, which stem largely from the need to "wring" or press the gage block being measured to the face of the anvil to such a degree that only a negligible amount of space remains between their faces. In "wringing" a gage block to the surface of a flat or serrated anvil an agent such as kerosene is generally used to prepare the face of the anvil and the block is then placed on this prepared surface and slid back and forth, or rotated, until "wringing" or seizure occurs. The distance between the upper and lower surfaces of the gage block is then determined, as by interferometry or other measurement, and the gage block is removed from the surface of the anvil. The removal is usually accomplished by sliding the gage block free, or preferably by soaking it free with a suitable fluid such as kerosene.

This method of "wringing" the object being measured to an anvil requires that the operator have a great deal of skill in order to establish a proper "wring." Such skill can be acquired only after considerable training and practice; and even with the most careful employment of this skill, errors in placement of the block being measured on the anvil will occur and result in erroneous readings. The present invention eliminates the need for such skillful manipulation while still assuring that very accurate measurements may be attained.

Another requirement of these prior art devices is that the operator be able to make the necessary measurements without damaging either the instrument or the object being measured, that is, he must be skilled in disengaging the element being measured and the anvil, after they have been "wrung" together and measured, in such a way as to minimize damage. However, even with a skillful operator exercising great care and with nearly perfect contacting surfaces, damage often occurs. The anvil associated with the instant invention eliminates this problem by dispensing with the need for "wringing."

Furthermore, the necessity for so much care in "wringing" a gage and an anvil and in disengaging them necessarily takes a great deal of time and makes for slow progress in making measurements and decreases the chances for getting reproducible results. By providing a gage block to an anvil, and the steps necessary to disengage the block from the anvil after "wringing," a great deal of tedious work is dispensed with and corresponding increases in efficiency are attained. Furthermore, accuracy is improved as shown in actual tests of this invention which have demonstrated that it is now possible to get more consistently accurate results in measurements than were possible previously.

It is an object therefore of this invention to provide an improved anvil capable of defining a reference plane with respect to which accurate measurements may be made.

It is a further object of this invention to provide a plurality of contact surfaces on an improved anvil which define a reference plane and which provide suitable physical means to support an object to be measured.

It is still a further object of this invention to provide means on an anvil which will make it possible to accurately measure a gage block or other article of manufacture without "wringing" it to the anvil.

Elimination of the need for "wringing" is a particular object of the invention, since "wringing" requires a great deal of skill to perform properly, it results in measurements which are hard to repeat and are therefore of questionable accuracy and it frequently results in damage to both the measuring apparatus and the object being measured.

The foregoing objects and others ancillary thereto I prefer to accomplish by the use of a novel anvil which provides a reference plane. The reference plane is defined by the faces of a number of lands which provide three reference points or two lines protruding about the face of the anvil. With this construction, only small areas of the anvil will be in direct contact with the object being measured. The use of small areas in this way has the effects of providing a suitable reference plane with respect to which measurements may be made, of eliminating the difficulties attendant upon "wringing" the object being measured to an anvil, and of providing a reference point in one of the small areas with respect to which the measurement can most accurately be made.

Figure 2:
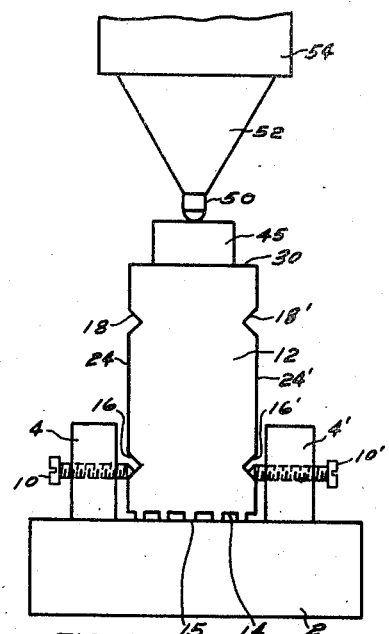
Figure 3:
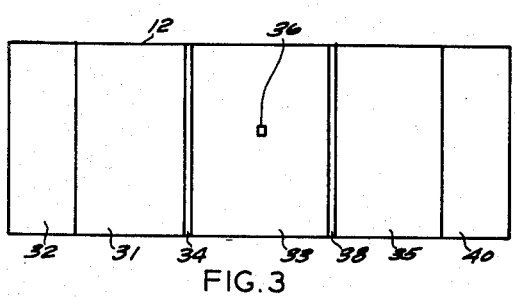
Figure 4:
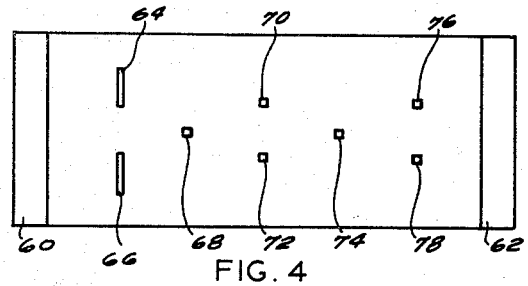

The novel features that we consider characteristic of our invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is an elevation illustrating the relationship between certain components of a measuring device such as an optical interferometer and illustrating the use of an anvil constructed in accordance with the instant invention, FIG. 2 is an end view of the apparatus shown in FIG. 1, FIG. 3 is a view of the top of an anvil, taken along III—III in FIG. 1, which shows a preferred embodiment of an important part of the invention, and FIG. 4 is a view of the top of an alternate embodiment of an anvil constructed in accordance with the principles of this invention.

Turning now to a more detailed discussion of the invention, we find in FIGS. 1 and 2 a general showing of apparatus used in certain extremely accurate measuring devices. In each of these figures is shown a block 2, representing the base of an instrument for making the measurements, upon which is mounted securely a pair of elements indicated at 4 and 4' which serve as an anchor for a measuring anvil 12. The screws 6, 8, 10 and 10' and screws 6' and 8' (not shown) can hold an anvil such as that at 12 in a secure position. The lower face of the anvil indicated at 14 and 15 may consist of a very flat surface, a serrated surface as indicated most clearly in FIG. 2, or a surface with a plurality of lands such as are shown in FIG. 3 or FIG. 4.

As was briefly indicated previously, the anvil 12 includes a means by which it may be gripped fast by screws such as 6, 8 and 10. These means on the anvil by which it may be fastened consist of flat faced grooves running lengthwise at 16, 18, 16' and 18'. The lower face of the anvil may consist of a very flat surface, as has previously been indicated, where the flatness may be of the order of a millionth of an inch, or it may consist of a serrated portion which may be considered to consist of low portions as indicated at 14 with a plurality of raised elements as indicated at 15 disposed therebetween, or it may consist of a plurality of lands such as 34, 36 and 38 and indentations such as 31, 33 and 35. Anvils with either a flat face or a serrated face are known and used in the prior art. The ends of the anvil at 20 and 22 may be flat as would be the faces 24 and 24', the long sides of the anvil, though it should be noted that the flat finish on the ends and sides of the anvil is not a critical matter and may be an ordinary machine finish, in contrast to the ultra-high flatness required for the upper and lower faces of the anvil.

The upper face 30 of the anvil 12 in the prior art devices has generally consisted of a very flat surface or of a serrated surface such as that shown at 14 and 15 in FIG. 2. Serrated surfaces generally run lengthwise of the anvil as indicated in FIG. 2. In the prior art devices the gauge block or other device indicated generally at 45 was "wrung" directly on the surface 30 or on a serrated face, and the measuring tip 50, having previously been lowered to contact the face of 30, was then lowered directly into contact with the upper face of a gauge block such as 45 to determine the measurement. The element 52 represent the measuring head of a typical interferometer or other measuring device which supports the measuring tip 50. The element 54 represents the body of an interferometer or other measuring device which carries the measuring head 52 and supports other measuring equipment which may be of conventional design. Reference may be made to U.S. Patent 2,604,004, issued July 22, 1952 to Elihu Root III entitled "Measuring Device Employing Light Interference Fringes," by way of example, which discloses a prior art device employing a measuring head and an anvil suggestive of that indicated in FIG. 1.

In these prior art devices, whether a flat head was used at 30 or a serrated head was used, it was found necessary to "wring" the object being measured, such as a gauge block 45, to the face of the anvil at 30. This "wringing step" has been necessary in the former art devices in order to bring the ultra flat surfaces of the anvil or the serrations on the anvil into near coplanar relationship with the flat face of the gauge block and consisted of sliding the gauge block along the face of the anvil until the two elements underwent "seizure" or appeared to be stuck together. In many instances the process of "wringing" involves additional preliminary steps such as applying kerosene or some similar liquid to the face of the anvil in order to provide a "wringing" film upon which the gauge block can be slid back and forth, or rotated, until "wringing" or "seizure" occurs. The distance between the upper and lower surface of the gauge block was then determined, usually by interferometry, and the gauge block was then removed from the surface of the anvil. The removal of the gauge block was usually accomplished by sliding the block free or preferably by soaking it free with kerosene or other suitable fluid.

As has previously been indicated, the process of "wringing" requires a highly skilled operator in order to establish a proper wringing film. Unfortunately, even with the most highly skilled operator and nearly perfect contacting surfaces, it is generally impossible with the "wringing" techniques to obtain reproducible results, the measurements made wit hthe same block by the same individual utilizing the same "wringing" techniques frequently resulting in differences in readings of one to several microinches. The fact that measurements are not reproducible, of course, fosters doubt as to whether the results are accurate. In addition to the circumstance that the accuracy of measurements made in this fashion are always subject to question, the process of "wringing" one very flat surface to another very frequently results in damage to one or both surfaces, apparently resulting from adhesion and cohesion between the molecules in separate flat surfaces when they are brought in close contact.

The present invention does away with the necessity for "wringing" the gauge block being measured to the surface of the anvil and with the need for a "wringing" fluid or film. At the same time, the damage resulting from "wringing" in the former manner has largely been eliminated. By eliminating the need for "wringing," the present invention also has done away with the need for highly trained personnel to operate interferometers and other highly accurate measuring devices, has decreased the chances that damage will be done to objects being measured or to the measuring device, and has greatly increased the reproducibility of measurements. Careful analysis of the measured results and comparison of those results with results of those obtained by "wringing" indicate that these results are not only consistent, but they are at least as accurate as, and generaly more accurate than, was previously obtained by averaging out several measurements by "wringing."

A preferred embodiment of the invention is shown in FIG. 3, where an anvil 12 is shown as having a series of raised and depressed areas, which may also be seen in FIG. 1, across its face which is generally indicated by the symbol 30 in FIGS. 1 and 2. In FIG. 3 the elevated portions, or lands, are indicated generally at 32, 34, 36, 38 and 40. The depressed areas are indicated at 31, 33 and 35. The lands 32 and 40 are substantially coplanar with the remaining lands shown in FIG. 3, but are provided as a manufacturing and refinishing convenience rather than as measuring surfaces, since they make it possible to more accurately and easily lap the remaining lands. The lands shown at 34, 36 and 38, which as indicated are substantially coplanar, will generally be raised above the recessed portions of the anvil 31, 33 and 35 by an amount of the order of 0.01 to 0.02 inch. The width of the lands or rails at 34 and 38 would generally be from 2 to 4 times the height of the lands, and the land or pin 36 generally would be a square in cross section of the same general dimensions as the width of the lands 34 and 38. It will be recognized, of course, that these measurements are only indicative of the general range of magnitudes which have been found useful in a preferred embodiment of the invention. The cross sectional area and the height will generally be chosen so that the wear rate will not be excessive, so that intimate contact may be obtained between the pin and a gauge block placed on the pin and rail, and so that the elastic deformation resulting from a gauge block resting on the pin does not cause a significant error. The gaging point or contact point should be made of the same material as the object being measured to eliminate errors due to deformation differences.

An anvil constructed in accordance with this invention is intended to establish a reference plane between a point (pin) such as 36 exhibiting a square cross section as explained above, and a line (rail) such as 38 being essentially an elongated rectangle. Additional points and additional lines such as are shown at 34 in FIG. 3 and at other points in FIG. 4 may be provided so that various size gauge blocks or parts may be handled properly. Different materials may be used for the points and the lines if desired. As shown in FIG. 1 the measuring head 50 will generally be positioned so that its measurements are made directly with respect to a pin such as 36 so that, in effect, the measurement of distance is made from one point to another. One of the advantages of this last arrangement is that the effects of overall out-of-flatness of the anvil surface will be minimized because of the small cross-sectional area of the primary reference point, or point to which the measurement is made. Another advantage of this construction is that the possible error which could result from the pin and rail not actually forming a plane which is parallel to the base of the anvil, as required for maximum accuracy, is minimized due to the small cross-sectional area of the pin or reference point with respect to which the measurement is actually made.

The spacing between the lands on the anvil and the size of the lands may be varied greatly to accommodate different sizes of elements to be tested. Some examples of these differences are indicated in FIG. 4 where the lands include large flat areas 60 and 62 which are chiefly used in lapping, and somewhat shorter lands at 64 and 66 which represent lands such as 34 and 38 of FIG. 3 which have been cut down in size, and lands 68, 70, 72, 74, 76 and 78 which may be of the same size or of varying sizes in accordance with the requirements of the units to be checked. In most instances, lands 68 or 74 will serve as the pin or reference point or gaging point with respect to which measurements will be made, and a selected pair of the other lands such as 64 and 66, 70 and 72 or 76 and 78 will be selected to provide two other points, with either 68 or 74, in order to define a plane with respect to which measurements can be made. In this mode of usage, either point 68 or point 74 will represent the actual base point with respect to which the measurement will be made. For some measurements, it may be preferable to have two lines or two rails such as 34 and 38 spaced to provide the reference plane.

It will be appreciated that an interferometer or other measuring device employing an anvil constructed in accordance with the principles disclosed in this invention may be operated by relatively unskilled personnel. Such personnel need only place an anvil of the type disclosed in this invention in position on a suitable base, so that a measuring land or pin will be contacted when the measuring tip of the interferometer reaches the face of the anvil. The measuring tip is then raised from the anvil, the gage block or other device is placed with one face on the anvil, preferably by a slight sliding motion, and the measuring tip is brought into contact with the opposite face of the gage block or other device. The count of interference fringes may be made by observation or automatically, as in the Root patent previously referred to, in order to determine the thickness.

The accuracy of the above procedure is assured by a number of special features. In the first place, it is not necessary to "wring" the device to be measured to the anvil. A simple sliding motion in which only the weight of the device being measured is applied between the anvil and the device is sufficient to bring them close together and to remove any air, dust or films which may exist between them. Since there has been no "wringing" the device being measured may be separated from the anvil by simply being slid off the anvil or lifted off. No special precautions for separating the two elements are necessary. The actual measurements are made between a small land or pin which is practically a point and a measuring head or point which is also very small. Thus the accuracy of the measurement is free of errors which might result in case the reference plane generated by a plurality of points or lines or combinations of lines and points in the face of the anvil should not be perpendicular to the line of motion of the measuring head.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. An anvil for use with devices for making very accurate measurements of linear distances comprising: a block, a plurality of lands raised a selected distance above a face thereof, said lands defining a plane parallel to said face, at least one of said lands being a small square and at least another of said lands being an elongated rectangle, all of said plurality of lands operative to support an object to be accurately measured, the area of said at least one of said lands not substantially exceeding the square of twice the selected distance between said face and said plane parallel to said face, said lands being so arranged that said object to be measured may be disposed upon said small square and said elongated rectangle, said small square and said elongated rectangle being sufficient to define said plane.

2. An anvil for use with devices for making very accurate measurements of linear distances comprising: a block, a plurality of lands raised a selected distance above a face thereof, said lands defining a plane parallel to said face, at least one of said lands being a small square and at least another of said lands being an elongated rectangle, all of said plurality of lands operative to support an object to be accurately measured, the area of each of said lands not substantially exceeding the square of twice the selected distance between said face and said plane parallel to said face, said lands being so arranged that an object to be measured may be disposed upon said small square and said elongated rectangle, said small square and said elongated rectangle being sufficient to define said plane parallel to said face.

3. An anvil for use with devices for making very accurate measurements of linear distances comprising: a block, a plurality of lands raised a selected distance above a face thereof, said lands defining a plane parallel to said face, at least one of said lands being a small square and at least one other of said lands being an elongated rectangle, the area of said small square being less than the square of twice the selected distance between said face and said plane parallel to said face, the area of said elongated rectangle being of substantial linear extent and also being less in width than the selected distance between said face and said plane parallel to said face, said lands being so arranged that an object to be measured may be disposed upon at least one of said lands being a small square and at least one other of said lands being an elongated rectangle, only so many of said lands as are necessary to define said plane.

References Cited by the Examiner

UNITED STATES PATENTS

| | | | |
|---|---|---|---|
| 1,157,762 | 10/15 | Commons | 33—174 |
| 1,889,897 | 12/32 | Johansson | 33—174 |
| 2,026,374 | 12/35 | Buttner | 33—174 |
| 2,837,828 | 6/58 | Cybulski | 33—168 |

ISAAC LISANN, *Primary Examiner.*

LOUIS R. PRINCE, *Examiner.*